United States Patent [19]

McCombs et al.

[11] 4,176,436
[45] Dec. 4, 1979

[54] METHOD AND APPARATUS FOR COUNTING TURNS WHEN MAKING THREADED JOINTS

[75] Inventors: Russell L. McCombs, San Antonio; James V. Motsinger, Austin, both of Tex.

[73] Assignee: Baker International Corporation, Orange, Calif.

[21] Appl. No.: 941,894

[22] Filed: Sep. 12, 1978

[51] Int. Cl.² .............................................. B25B 23/14
[52] U.S. Cl. ...................................... 29/240; 29/407; 73/139; 81/52.5; 173/12
[58] Field of Search ...................... 29/240, 407; 173/1, 173/12; 73/88 F, 139; 81/52.4 R, 52.4 B, 52.5

[56] References Cited

U.S. PATENT DOCUMENTS

| | | | |
|---|---|---|---|
| 3,368,396 | 2/1968 | Burkles et al. | 73/139 |
| 3,606,664 | 9/1971 | Weiner | 73/139 |
| 3,745,820 | 7/1973 | Weiner | 73/139 |
| 3,975,954 | 8/1976 | Barnich | 81/52.5 X |
| 4,091,451 | 5/1978 | Weiner et al. | 73/139 X |
| 4,104,778 | 8/1978 | Vliet | 29/407 |
| 4,104,780 | 8/1978 | Sigmund | 29/407 |
| 4,106,176 | 8/1978 | Rice et al. | 29/407 |
| 4,142,266 | 3/1979 | Dahl | 29/407 X |

*Primary Examiner*—Leon Gilden
*Attorney, Agent, or Firm*—William C. Norvell, Jr.

[57] ABSTRACT

A method and apparatus are disclosed for making threaded joints, such as pipe joints, within a range of predetermined applied torque and turns values. A pipe or a pipe and a coupling are threaded onto the end of a pipe string. The applied torque is monitored and, when a reference torque value is exceeded, the number of turns are counted. When either the actual torque or the actual turns exceeds a predetermined minimum value for that parameter and the value of the other parameter exceeds a predetermined minimum value, but is less than a predetermined maximum value, a good joint is indicated and the make-up is stopped. A bad joint is predicted and make-up is stopped when the value of the actual torque divided by the actual turns falls outside a range of values defined by the slopes of a pair of boundary lines and predetermined minimum torque and minimum turn values. The actual turns value is a count which is initiated the first time the actual torque value equals the reference torque value, the count being incremented when the actual torque value is greater than the reference torque value and being decremented when the actual torque value is less than the reference torque value.

8 Claims, 10 Drawing Figures

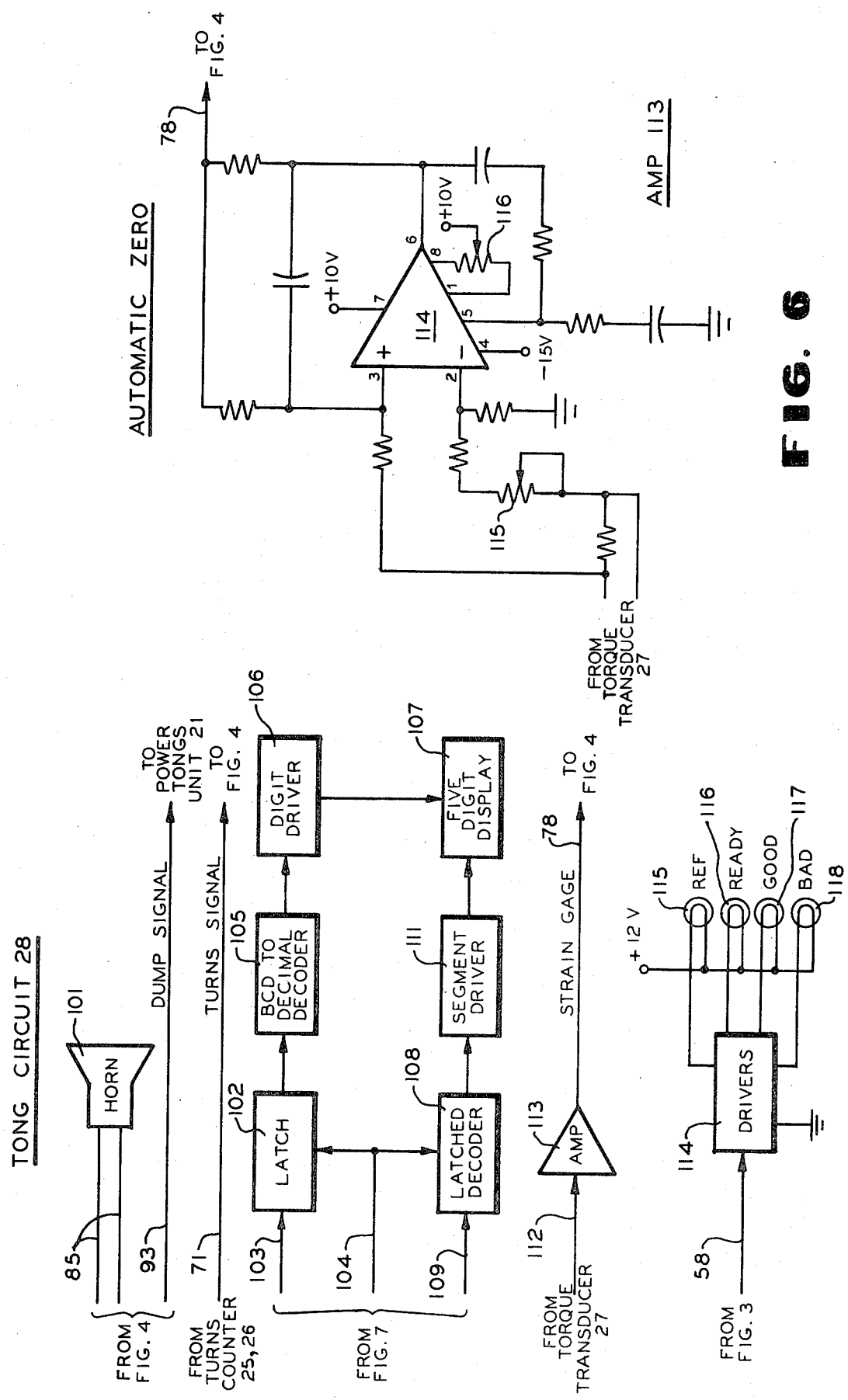

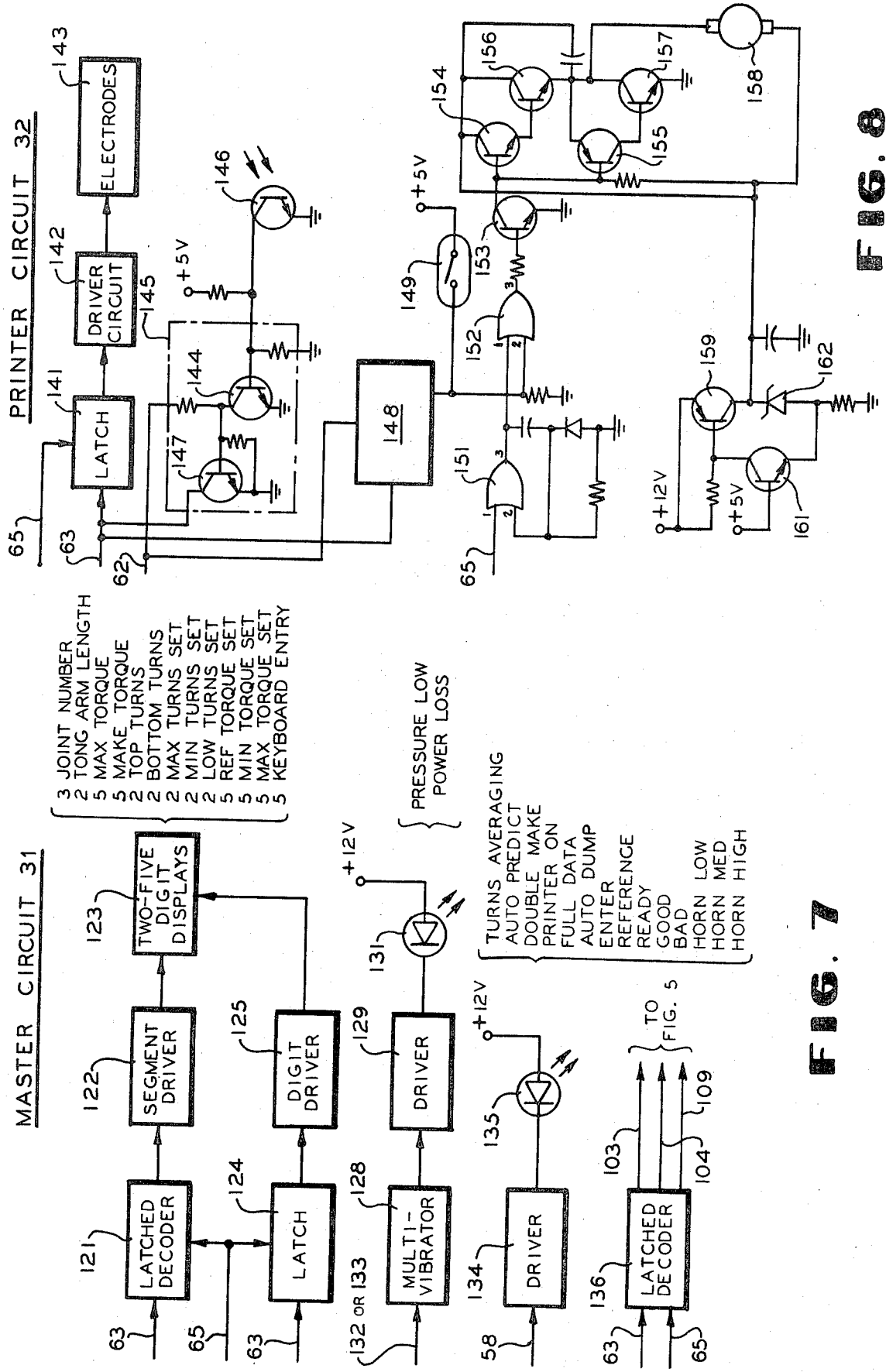

METHOD AND APPARATUS FOR COUNTING TURNS WHEN MAKING THREADED JOINTS

BACKGROUND OF THE INVENTION

1. Field of the Invention

The present invention relates in general to an apparatus for monitoring the operation of making threaded tubular joints and in particular to an apparatus for controlling the applied torque and number of turns in such an operation.

2. Description of the Prior Art

After a bore hole has been drilled to an oil or gas deposit, pipe strings are run into the bore hole for removing the oil or gas. The pipe strings are assembled at the well site from pipe sections each having external threads at one end and an internally threaded box member at the other end or external threads at both ends for use with an internally threaded coupling collar. As the pipe sections are connected together, they are run into the bore hole. Each pipe section is assembled to the top of the pipe string utilizing a power tongs unit which has a rotary jaw member for gripping the pipe and a motor for rotating the jaw member until the pipe section has been tightened to the desired degree. The joint must be tight enough to prevent leakage and to develop high joint strength but not so tight so as to damage the threads which can leak.

Early prior art techniques involved the determination of the applied torque to achieve the desired degree of tightness in the joints. For example, one technique involved the adjusting of the air supply maximum output pressure to a pneumatically driven tong motor to provide the required maximum torque as dictated by joint properties and tong power characteristics. Thus, the proper torque was developed when the tong motor stalled. Another technique involved the counting of the number of turns after the threads had been engaged at a "hand tight" point. These early techniques were unsatisfactory since the desired torque could be developed early as a result of damaged or dirty threads.

One prior art device which attempted to solve the poroblem included means for producing a signal indicating of the number of turns of the pipe section after measurement of a given torque by the torque measuring means. The device produced a warning of a bad joint upon the measurement of a predetermined torque before a measurement of a minimum number of turns had occurred or the measurement of the maximum number of turns before the measurement of the predetermined torque had occurred. The device indicated a good joint upon the measurement of the predetermined torque value between the measurement of the minimum and maximum number of turns. Such a device is shown in U.S. Pat. No. 3,368,396 issued Feb. 13, 1968. Improvements to that device are disclosed in U.S. Pat. No. 3,606,664 issued Sept. 21, 1971, U.S. Pat. No. 3,745,820 issued July 17, 1973, and U.S. Pat. No. 4,091,451 issued May 23, 1978.

SUMMARY OF THE INVENTION

The present invention concerns a control means for an apparatus for assembling threaded members, such as pipe sections, to form a pressure sealed joint. The assembly apparatus includes power tong means connected to one of a pair of pipe sections for rotating that pipe section with respect to the other pipe section, transducer means responsive to the torque applied to the one pipe section by the pipe rotating means for generating a signal representing the applied actual torque value, and means responsive to the rotation of the one pipe section for generating a signal representing the turns of the one pipe section.

The control means includes means for generating a signal representing a reference torque value; means responsive to the reference torque signal and the actual torque signal for generating an up count signal and a down count signal when the value of the actual torque signal is greater than and less than the value of the reference torque signal respectively, the up and down count signals being generated only after the first time the value of the actual torque signal exceeds the value of the reference torque signal; means responsive to the actual turns signal for counting the turns, the counting means being responsive to the up count signal for incrementing a count total of the turns in response to the actual turns signal and being responsive to the down count signal for decrementing the count total in response to the actual turns signal; means for generating an average actual turns signal representing the count total of the counting means; and means responsive to the actual torque signal and the average actual turns signal for controlling the rotating means.

The present invention also concerns a method for making threaded joints from a pair of cooperatively threaded members within a range of predetermined applied torque and turns values. The method includes the steps of engaging the cooperating threads and rotating one of the members with respect to the other of the members; monitoring the actual torque applied to the one member; accumulating a count total of the turns made by the one member after a predetermined reference torque value has been reached, adding turns to the count total when the actual torque is greater than the reference torque and subtracting turns when the actual torque is less than the reference torque; and indicating when the count total and the actual torque values are within the range of predeterined applied torque and turns values.

It is an object of the present invention to reduce the potential for damage to threaded members when making threaded joints.

It is another object of the present invention to accurately count the number of turns made when joining threaded members.

It is a further object of the present invention to increase the quality of threaded joints such as joints between pipe sections.

BRIEF DESCRIPTION OF THE DRAWINGS

FIG. 5 is a block diagram of the tong circuit included in the tong remote unit of FIG. 1.

FIG. 6 is a schematic diagram of the amplifier shown in the tong circuit of FIG. 5.

FIG. 7 is a block diagram of the master circuit included in the input/output devices of FIG. 1.

FIG. 8 is a partial block, partial schematic diagram of the printer circuit included in the printer of FIG. 1.

DESCRIPTION OF THE PREFERRED EMBODIMENTS

Figure 1:
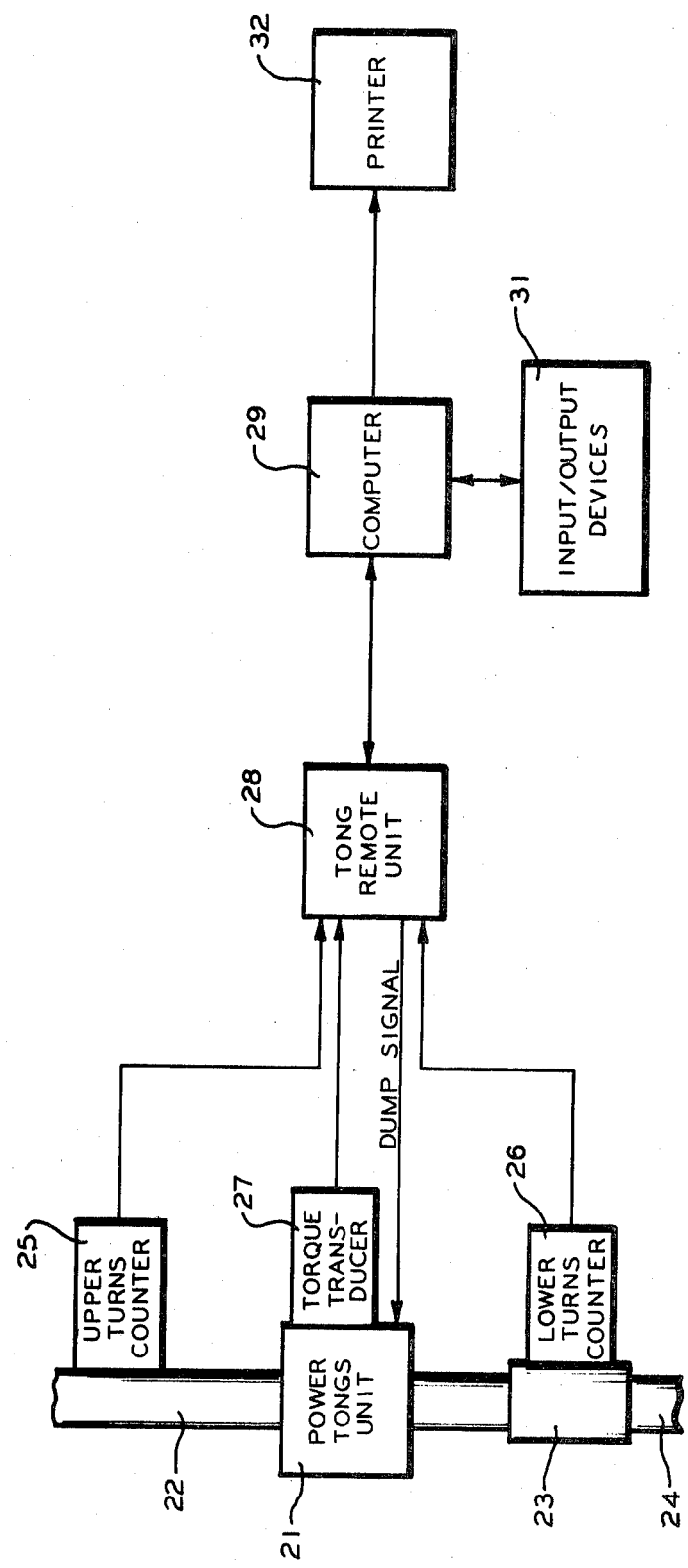
FIG. 1 is a block diagram of an apparatus for threading pipe and a control system therefor according to the present invention.

FIG. 1 is a block diagram of a torque and turns controller according to the present invention. A power tongs unit 21 grips and rotates a pipe section 22, the lower end of which is threaded into a pipe coupling 23 which, in turn, is threaded into the upper end of a pipe section 24. The pipe section 24 represents the upper end of a pipe string extending into the bore hole of a well (not shown). The power tongs unit 21 is well-known in the industry and is not shown in detail.

An upper turns counter 25 senses the rotation of the upper pipe section 22 and generates a signal representing such rotational movement. Similarly, a lower turns counter 26 senses the rotation of the pipe coupling 23 and generates a signal representing such rotational movement. A torque transducer 27 is attached to the power tongs unit 21 and generates a signal representing the torque applied to the upper pipe section 22 by the power tongs unit 21. The signals from the counters 25 and 26 and from the transducer 27 are inputs to a tong remote unit 28. A computer 29 monitors the counters and transducer signals and compares the present values of these signals with operator entered values to provide control signals to the operator. The operator enters values of low, minimum and maximum turns and reference, minimum and maximum torque through an input device, such as a keyboard, which can be included in a plurality of input/output devices 31. Turns counting will be started by the computer 29 when the joint reaches a reference or "hand tight" torque. When both the torque and turns criteria have been satisfied, the operator will be signaled by the computer through an output device such as a green light and a steady audio tone. The computer can signal a bad joint with a red light and a warbling audio tone. In addition, the computer can generate a dump signal through the tong remote unit 28 to the power tongs unit 21 to automatically shut down the power tongs upon reaching either a good or a bad joint. The computer 29 can also output signals representing the torque and turns values to a printer 32 such as a strip chart recorder or a digital printer, or a plotter, such as an x-y plotter.

Tables are available of ranges of torque and turns values which will result in a bearing pressure sufficient to form a pressure seal in a pipe joint. The minimum and maximum values for both torque and turns are read from the tables based upon the size, connection type, grade and weight for each string of pipe. These maximum and minimum values define an area for a good joint and a typical plot of torque versus turns is shown in FIG. 2a. The counting of the turns begins only after a metal-to-metal or hand tight make-up has been achieved which is represented as the reference "REF" dashed line 42. The REF torque value provides a reference point after which a predetermined number of turns applied will induce a known stress in the thread provided that the thread and its materials are within the available specifications. In practice, however, turns alone cannot be relied upon to achieve proper stress levels in sealing engagement, since it is impractical to inspect each and every thread property and dimensions. Nor does the measurement of torque alone insure proper stress levels and sealing engagement because dimensional, material and frictional properties vary. Through practical and theoretical analysis, it has been shown that the make-up of threaded joints simultaneously within certain torque and turns parameters will insure joint integrity.

The computer 29 of FIG. 1 is responsive to the torque and turns signals for determining when a good joint has been made. When either a minimum torque or a minimum turns value has been reached, the computer 29 will then look for the minimum value of the other parameter and signal the operator that a good joint has been made if that minimum value of the other parameter is reached before the maximum value for the first parameter is reached. Thus, during make-up of the joint represented by a circle 43, the computer sensed that the minimum turns value had been reached before the minimum torque value and stopped the make-up of the joint when the minimum torque value was reached. Conversely, during the make-up of the joint represented by a circle 44, the computer sensed the minimum torque value and, therefore, stopped the make-up of the joint when the minimum turns value was sensed. A joint represented by a circle 45 reached the maximum torque value before the minimum turns value was reached indicating a dirty, rough, damaged, improperly lubricated, or dimensional out of tolerance thread. A joint represented by a circle 46 reached the maximum turns value before reaching the minimum torque value, indicating a worn or out of tolerance thread, a weak or incorrect thread or coupling material, or perhaps the use of a non-standard thread lubricant or coating.

It is desirable to avoid making the joint 45 and 46 since they waste time and, in the case of the joint 45, places more stress on the pipe string than is required. Therefore, the present invention automatically predicts such bad joints and stops the joint making process. A bad joint is predicted when after reaching minimum torque, actual torque divided by actual turns is greater than maximum torque divided by minimum turns. These criteria define a boundary of an indicating area to the left of line 47 and above the minimum torque line as shown in FIG. 2a. A bad joint is also predicted when after reaching minimum turns, the actual torque divided by the actual turns is less than the minimum torque divided by the maximum turns. These criteria define the boundaries of an indicating area below line 48 and to the right of the minimum turns line as shown in FIG. 2a. After either the torque or the turns value exceeds a corresponding minimum value, the computer monitors the actual torque and the actual turns values to prevent movement into one of the indicating areas defined above. When movement into either indicating area is detected, the computer 29 of FIG. 1 turns on a light indicating that a bad joint is being made. The computer 29 can also generate a dump signal through the tong remote unit 28 to shut off the power tongs unit 21. When either one of the two sets of conditions has been satisfied, the computer 29 of FIG. 1 turns on a light indicating that a bad joint is being made. The computer can also generate a dump signal through the tong remote unit 28 to shut off the power tongs unit 21.

The torque and turns values shown in FIG. 2a can also be utilized to generate other warning signals. For example, when the actual torque value exceeds the reference torque value REF, a light can be turned on to indicate to the operator to shift from a higher speed to a lower speed on the power tongs unit. Such operation increases the speed with which a joint can be made and decreases the changes of damaging the threads on either the pipe sections or the coupling should the threads be misaligned. When the make-up line has reached either the minimum torque or the minimum turns value and is predetermined percentage from the minimum value of the other parameter, a light can be lighted to indicate to the operator that he should be ready to shut down the power tongs unit since the joint is almost finished. Typically, the percentage can be ninety percent. When the make-up line reaches the minimum torque value before reaching a LOW turns value, the make-up process can be stopped since a bad joint will probably result.

The present invention includes an automatic turns averaging feature. During the make-up of a pipe, the torque does not increase linearly with the turns. This is caused by such factors as wind loading on the pipe and non-concentric pipe.

Figure 2B:
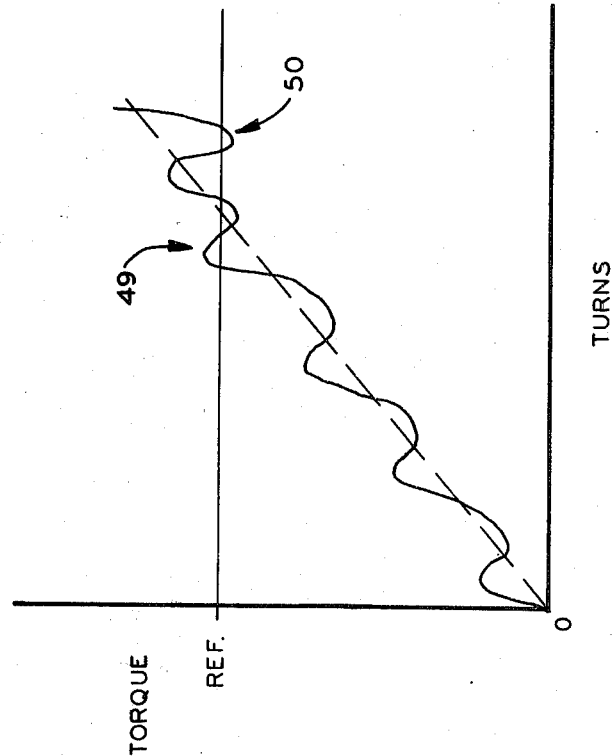
FIG. 2b is a plot of torque versus turns illustrating the turns averaging feature of the present invention.
Figure 2A:
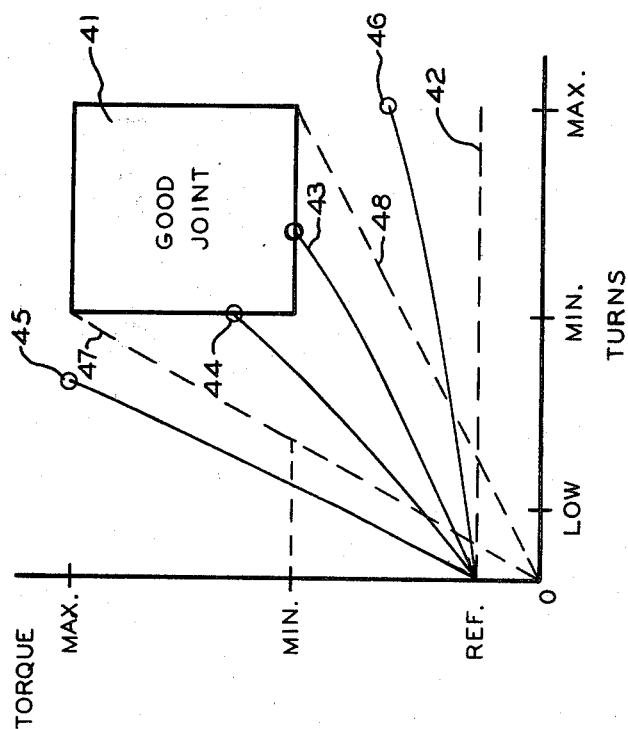
FIG. 2a is a plot of torque versus turns illustrating joint make-up values for typical joints.

FIG. 2b is a plot of torque versus turns wherein a straight dashed line represents the average applied torque and the solid, wavey line represents the actual torque which is applied. An area 49 of the actual torque line extends above a reference REF torque line and can represent one or more turns counts before the average torque exceeds the reference torque. An area 50 of the actual torque line extends below the reference torque line and can represent one or more turns counts after the average torque exceeds the reference torque.

In the prior art, the counting of turns was initiated and continued uninterrupted after the actual torque reached the REF torque line. Often, conditions such as wind loading on the pipe or non-concentric pipe would cause the actual torque to reach or exceed the REF torque line prematurely resulting in false turns being counted. These false turns were largely ignored or left up to the operator to observe and to compensate therefor. Thus, the false turns became a point for error. The present invention automatically adjusts the turns count for false turns. The turns are counted by an up/down counter which counts turns when the actual torque is above the reference torque and subtracts turns when the actual torque is below the reference torque. However, when counting, the counter will count down to zero, but never become negative.

Figure 3:
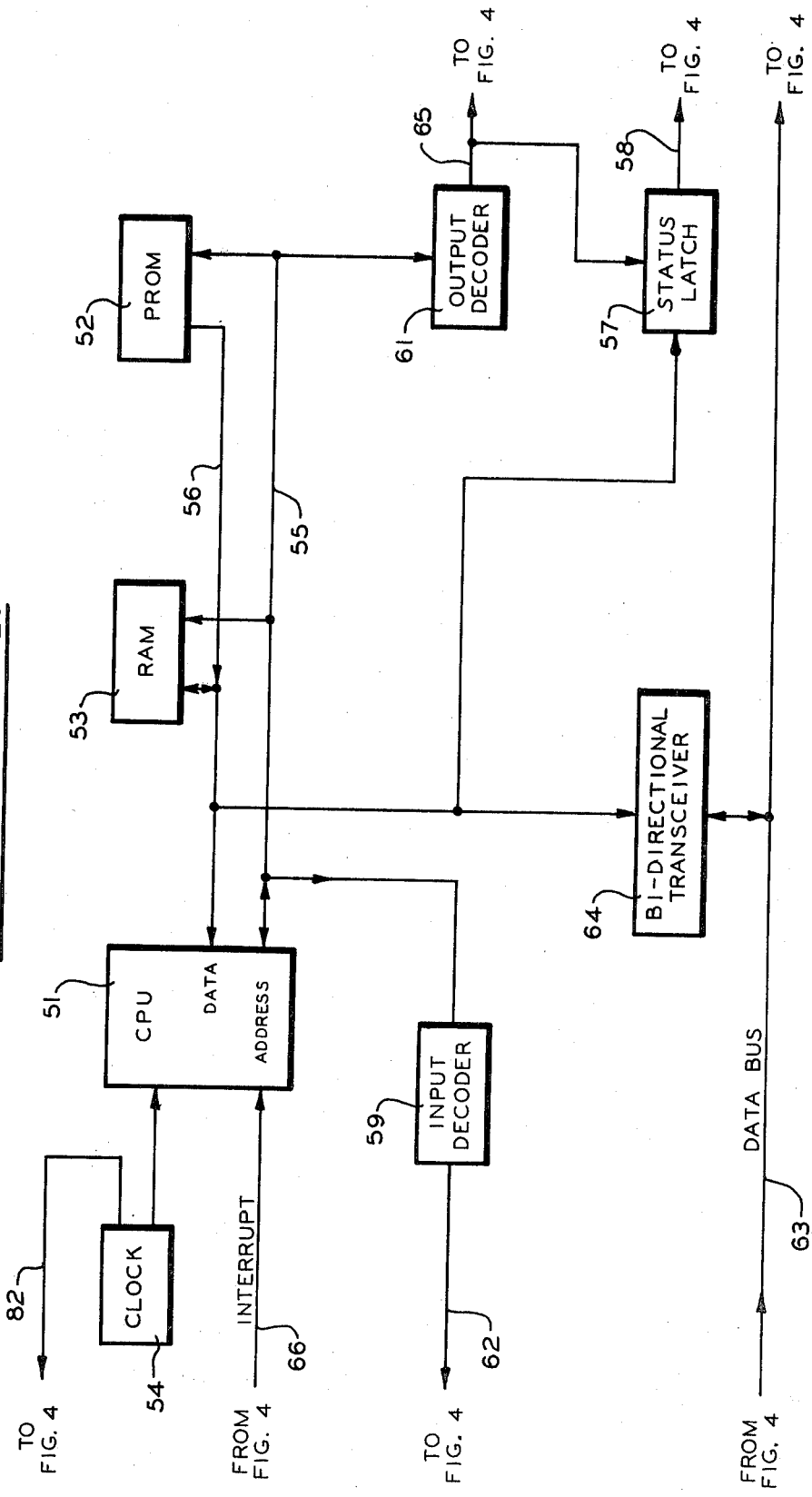
FIG. 3 is a block diagram of the computer circuit included in the computer of FIG. 1.

FIG. 3 is a block diagram of a computer circuit included in the computer 29 of FIG. 1. The computer circuit 29 includes a microprocessor central processing unit (CPU) 51, a programmable read only memory (PROM) 52 and a random access memory (RAM) 53. A clock 54 generates a train of clock pulses to the CPU 51 the frequency of which determines the timing of the computer circuit including the execution time for the program instructions. The computer program is stored in the PROM 52 as a predetermined series of instructions. The CPU 51 generates a predetermined series of address signals on a plurality of address line 55 to the PROM 52 which responds to the address signals by generating signals on a plurality of data lines 56 representing the instructions in order. The address lines 55 and the data lines 56 are bi-directional but the PROM 52 can only receive address signals and generate data signals. The RAM 53 is also connected to the address lines 55 and the data lines 56 and is utilized as a scratch pad memory to temporarily store the preset values for minimum and maximum torque and turns and data points for the actual torque and turns values prior to printing.

The computer circuit also includes a status latch 57 which has a plurality of status output lines 58 which can be latched on or off in order to control such elements as indicator lights and the turns counters as will be discussed below. The address lines 55 are connected to an input decoder 59 and an output decoder 61. The input decoder 59 responds to selected address signals for generating input strobe signals on a plurality of strobe lines 62. These strobe signals are sent to various other circuits to signal that the CPU 51 is ready to read data from a data bus 63. The data bus 63 includes a plurality of lines connected to a bi-directional transceiver 64 which is in turn connected to the data lines 56. Data on the bus is read through the bi-directional transceiver 64 by the CPU 51. The output decoder 61 responds to selected address signals for generating strobe signals on a plurality of strobe lines 65 to the status latch 57 and the various other circuits which will be discussed below. The output strobe signals indicate to the other circuits that the CPU 51 has data to send to them through the bi-directional transceiver 64 and onto the data bus 63. Thus, when the CPU 51 needs an input signal such as a top turn counter value, it will provide the appropriate input strobe signal by addressing the input decoder 59 and will read the needed information from the data bus 63 through the bi-directional transceiver 64 on the data lines 56. When the CPU 51 generates output data such as display information, it generates an address to the output decoder 61 to generate an output strobe signal and places the information on the data bus 63 through the bi-directional transceiver 64.

During normal operation, the computer circuit executes the main problem reading, comparing and calculating torque and turn values on a repetitive basis. However, when either of two interrupt lines 66 receive an input signal, the CPU 51 executes subprograms before returning to the main program. One subprogram is utilized to drive the displays in the input/output devices 31 of FIG. 1. The displays are connected in five groups and each group is turned on twenty percent of the time and is blank eighty percent of the time. This occurs at a speed such that the displays appear to be continuous to the human eye. Each display group is on for about one millisecond and off for about five milliseconds. The other subprogram is utilized to read inputs from a keyboard in the input/output devices 31. The CPU 51 performs the function indicated by the key that was depressed and then returns to the main program.

In summary, the computer circuit 29 generates two types of outputs and receives two types of inputs. The outputs from the status latch 57 on the lines 58 are semi-permanent, remaining in either the on or the off state once set by the CPU 51. The output data on the data bus 63 is read by other circuits only during the time that the output decoder 61 is generating an output strobe signal on one of the lines 65. Input data is either requested by the CPU 51 by generating an input strobe signal from the input decoder 59 on one of the strobe lines 62 or is read in response to an interrupt signal on one of the interrupt lines 66.

Typically, the clock 54 is a crystal controlled oscillator which generates a two MHz clock signal to the CPU 51. The CPU can be a model Z-80 microprocessor. The RAM 53 can be four model P2101A-4 random access memories connected in parallel and the PROM 52 can be two C2716 programmable read only memories connected in parallel. The input decoder 59 and the output decoder 61 each can be a model MC14514D four to sixteen line decoder. The status latch 57 can be three model 4508 dual four bit latches connected in parallel. The bi-directional transceiver 64 can be a model DB8304B.

Figure 4:
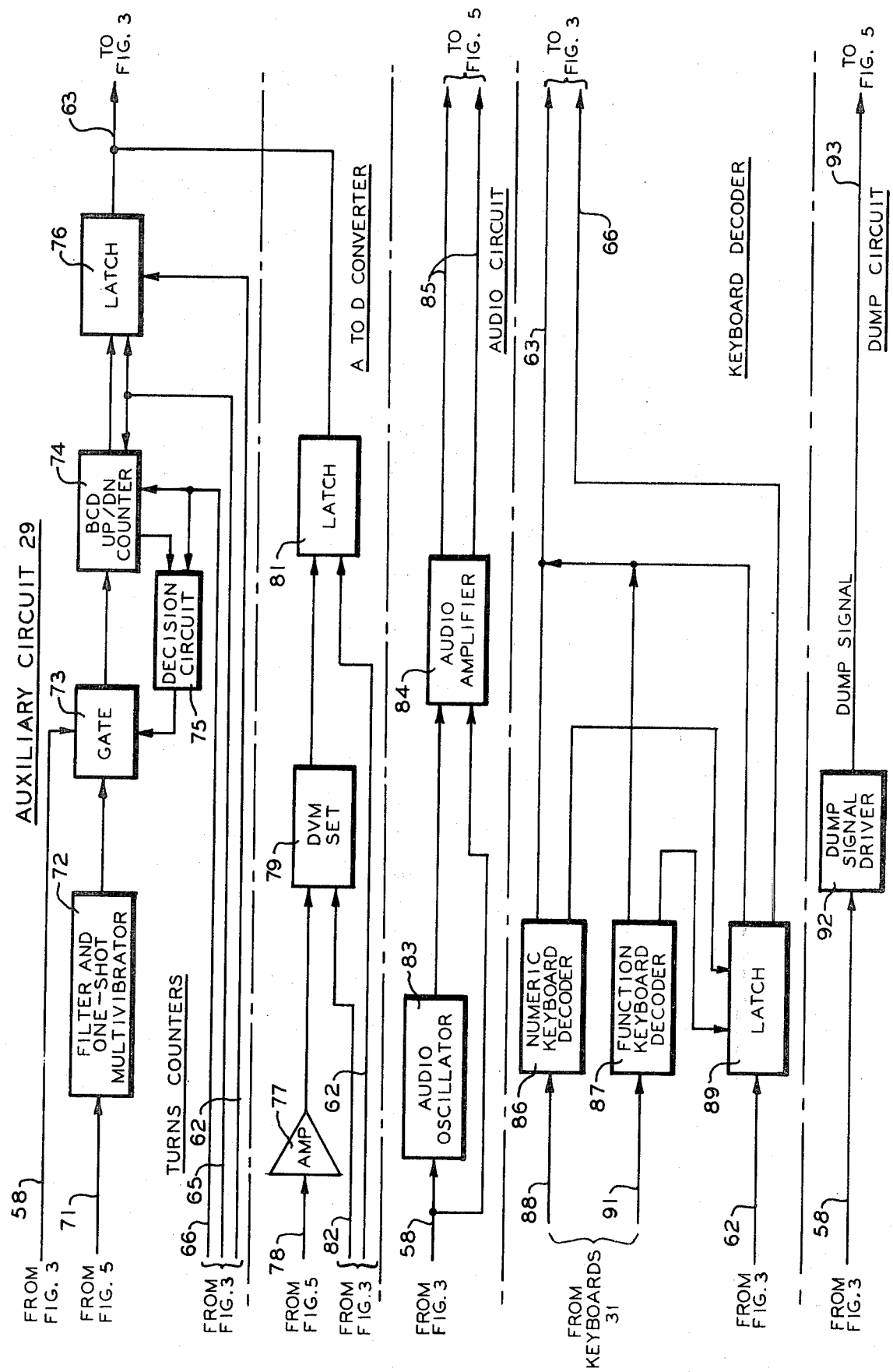
FIG. 4 is a block diagram of the auxiliary circuit included in the computer of FIG. 1.

FIG. 4 is a block diagram of an auxiliary circuit which is included in the computer 29 of FIG. 1. The auxiliary circuit 29 performs five functions. These are counting the upper and lower turns, converting the torque input signals from analog to digital form, decoding the keyboard input signals, generating the audio warning signals and generating the dump signal. The top and bottom turns counting circuits are identical and only one will be described here. An input from either the upper turns counter 25 or the lower turns counter 26 of FIG. 1 is received on a line 71. Typically, the turns counter includes a microswitch or a proximity switch which opens and closes as the pipe section and the coupling are rotated. The turns counter signal is filtered to prevent false triggering caused by switch bounce when the switch closes. The output signal from the filter is an input to a one shot multivibrator which generates a pulse of sufficient time duration to blanket the switch bounce as the switch opens again. A filter and one shot multivibrator 72 generates an output pulse representing one actuation of the turns counting switch to a gate 73. The pulse is fed through the gate 73 to a binary coded decimal BCD up/down counter 74 which counts from zero to ninety-nine. The gate 73 will pass the pulse from the filter and one shot multivibrator 72 only when it is enabled by a status signal on one of the lines 58 from the status latch 57 of FIG. 3 and a signal from a decision circuit 75. The status signal on the line 58 is only generated when the actual torque value is above the reference torque value shown as the line 42 in FIG. 2a. The decision circuit 75 is responsive to the output of the counter 74 and an interrupt signal on the line 66 to insure that in the count down operation the counters will count only to zero and then all inputs will be shut off. If this is not done and an input pulse occurs in the count down mode with a zero count in the counters, the counters would step to ninety-nine which would be a false reading. The decision circuit 75 is responsive to the interrupt signal which also determines whether the counter 74 will be counting up or down and is responsive to the carry out signal from the counter 74 which indicates whether the counter is at zero or not.

The counter total from the counter 74 is an input to a tri-state latch 76. When the computer circuit 29 of FIG. 3 is ready to read the counter circuit output, it generates an input strobe signal on one of the lines 62 which turns the tri-state output on and generates the data on the data bus line 63. However, prior to this reading operation, the computer circuit generates an output strobe signal on one of the lines 65 to latch the data from the counter 74 into the latch 76. The one shot multivibrator 72 can be a model MC14528B. The BCD up/down counter 74 can be a pair of model 4510 counters connected in series for counting a two digit number up to ninety-nine. The decision circuit can be an OR gate having its inputs connected to the interrupt line 66 and the carry out outputs of the two counters 74. The latch 76 can be a model MC14508B dual four bit latch with buffer.

The analog to digital converter includes an operational amplifier 77 with a gain of approximately two having an input connected to a line 78 for receiving the output signal from the torque transducer 27 of FIG. 1. The torque transducer 27 typically includes a strain gage bridge which generates a voltage proportional to the sensed torque which voltage is preamplified in the tong remote unit 28 of FIG. 1 and applied to the line 78. The output from the amplifier 77 is read by a DVM set 79 with a resolution of one millivolt. The DVM set 79 is a dual slope integrater with a plus and minus one count accuracy over the entire input voltage range. The DVM set 79 generates the analog input signal as a four digit digital output signal to a latch 81. The DVM set 79 also receives a clock signal on a line 82 from the clock 54 of FIG. 3 at a frequency of approximately two hundred fifty KHz for controlling the sampling of the analog input signal. The computer circuit of FIG. 3 also generates an input strobe signal on one of the lines 62 to the latch 81 to place the output signals to the DVM set 79 on the data bus 63 so that they can be read by the computer circuit. The strobe signal also starts the DVM set 79 on the next reading of the analog signal. The rate at which the torque signal is read and sent to the computer circuit is approximately fifty readings per second.

The amplifier 77 can be a model 748 and the DVM set 79 can be an ICL 7103 and a ICL 8052. The latch 81 can be two model MC14508B dual four bit latches.

One of the warning signals to the operator is generated as an auto signal. A status latch signal is received on one of the status lines 58 by an audio oscillator 83 to turn the oscillator on and off. A second input on one of the status lines 58 determines whether a single or a two tone output is generated. If the second signal is not present, a low frequency signal tone is generated. When the second signal is present, both high and low frequencies are generated and are alternated to produce a two tone warbling effect. The output from the audio oscillator is an input to an audio amplifier 84 which generates the drive signal to a horn in the tong remote unit 28 in FIG. 1 on a pair of lines 85. The audio amplifier 84 can include a pair of model LM380 amplifiers connected in a push/pull circuit. The computer circuit of FIG. 3 also generates one of three status signals on corresponding ones of the status lines 58 to the audio amplifier 54 to select the gain of the amplifier and thereby control the volume at high, medium and low levels.

The keyboard decoder includes a numeric keyboard decoder 86 and a function keyboard decoder 87. The numeric keyboard decoder 86 receives signals on lines 88 from a numeric keyboard (not shown) which signals indicate the coordinants of a depressed key in the keyboard. The numeric keyboard decoder 86 then generates a strobe signal to a latch 89 and signals representing a binary coded decimal identification of the depressed key on the data bus lines 63. In a similar manner, the function keyboard decoder 87 receives signals on lines 91 representing the coordinants of a depressed key in the function keyboard (not shown). The function keyboard decoder 87 responds to the signals on the lines 91 by generating a strobe signal to the latch 89 and binary coded decimal identification signals representing the depressed key on the data bus lines 63. Either of the strobe signals will generate an interrupt signal from the latch 89 on the interrupt line 66 to the CPU 51 in the computer circuit of FIG. 3. The CPU 51 responds to the interrupt signal by generating an input strobe signal on one of the lines 62 to the latch 89. The latch then generates a signal on the data bus lines 63 identifying which of the keyboards has had one of its keys depressed. Then the CPU 51 reads the binary coded decimal identification signals from the data bus lines 63 representing the key in the identified keyboard. The keyboard decoders 86 and 87 can each be a model 74C922 and the latch 89 can be a model MC14508B dual four bit latch.

If the power tongs unit 21 of FIG. 1 is to be automatically controlled as to shut down, the CPU 51 generates a status latch signal on one of the lines 58 to a dump signal driver 92 which responds to the status latch signal by generating a signal on a dump signal line 93. The dump signal on the line 93 is generated to the tong remote unit 28 of FIGS. 1 and 5. The dump signal driver 92 can be a transistor switching circuit responsive to the low level status signal for generating a higher power signal such as would be utilized to actuate a solenoid controlled valve for turning off the power to the power tongs unit 21.

FIG. 5 is a block diagram of the tong circuit included in the tong remote unit 28 of FIG. 1. The tong circuit includes a horn 101 connected to the horn signal lines 85 from the audio circuit of FIG. 4. The horn 101 generates separate audio warning signals for good and bad joints. The dump signal line 93 passes through the tong circuit 28 from the auxiliary circuit 29 of FIG. 4 to the power tongs unit 21 of FIG. 1. The turns signal lines 71 pass through the tongs circuit 28 from the turns counters 25 and 26 of FIG. 1 to the turns counter circuits of the auxiliary circuit 29 of FIG. 4.

The tongs circuit 28 includes a five digit display of the actual torque in real time and four status lights indicating good and bad joints, an actual torque above the reference torque, and a warning to the operator to be ready to stop the power tongs unit. A latch 102 receives a strobe signal on a line 103 and four bits of binary coded decimal data on data lines 104 from a master circuit which will be discussed below. The data on the lines 104 is stored in the latch 102 and is generated to a binary coded decimal (BCD) to decimal decoder 105. The decoder 105 generates output signals to a digit driver 106 to enable a selected one of five digits of a five digit display 107. A latched decoder 108 receives a strobe signal on a line 109 and data signals on the lines 104 from the master circuit. The data signals are stored in the latched decoder 108 which generates seven segment signals to a segment driver 111 which in turn enables selected segments of the digit which has been selected in the five digit display 107. Thus, the same data lines 104 are utilized to select one of five display digits and to select a digit from zero to nine in the selected digit position of the display 107. The data to be displayed represents the actual torque value in real time.

The latch 102 can be model 4508 dual four bit latch, the decoder 105 can be a model 4028 BCD to decimal decoder and the digit driver 106 can be a model DI220 driver connected in series with a model DI602 driver. Typically, the driver is enabled to apply an approximately two hundred volt signal to the selected display digit. The latched decoder 108 can be a model 4511 BCD to seven segment latch decoder and the segment driver can be a model DI220 driver. Typically the display 107 is a seven segment, five digit gas discharge tube display.

A signal generated by the torque transducer 27 of FIG. 1 is received on a line 112 as an input to an amplifier 113. The amplifier 113 preamplifies the torque signal and generates it on the line 78 to the amplifier 77 of the analog to digital converter shown in FIG. 4. The amplifier 113 includes an automatic zero feature which will be discussed in connection with the description of FIG. 6.

The tongs circuit 28 also includes status lights for the operator. A group of four status signals representing actual torque above the reference REF torque, get ready to shut down, a good joint and a bad joint are generated by the computer circuit 29 of FIG. 3 on corresponding ones of the status latch lines 58 to lamp drivers 1114. A separate driver for each lamp responds to the corresponding status signal by grounding one side of one of a plurality of incandescent lamps 115, 116, 117 and 118, the other side of each lamp being connected to a supply voltage such as a positive twelve volts. Typically, the drivers 1114 can be a switching transistor having a base connected to the status latch signal line 58, a collector connected to the corresponding lamp and an emitter connected to the ground potential of the twelve volt power supply.

FIG. 6 is a schematic diagram of the amplifier 113 of the tongs circuit 28 shown in FIG. 5. One of the problems encountered with utilizing a torque signal on a real time basis is a drift in the analog signal level. The amplifier 113 can include an operational amplifier 114 which can be a model 725 operational amplifier. An inverting input 114-2 and a non-inverting input 114-3 are connected to the torque transducer 27 of FIG. 1. A potentiometer 115 is connected in series between the input 114-2 and one input line from the torque transducer 27. The potentiometer 115 is utilized to adjust the offset of the operational amplifier 114. The offset is such that the output signal for a zero torque input will never drift below zero volts. The computer reads the output signal voltage on the line 78 and subtracts that value from each actual torque voltage reading to obtain the actual torque readings. The offset voltage value is reset in the computer each time a joint is finished. A potentiometer 116 is connected between a pair of offset inputs 114-1 and 114-8 of the amplifier 114. The potentiometer 116 has a tap connected to a positive ten volt power supply (not shown) and is utilized to set the operating parameters of amplifier 114 to the most stable state.

The transducer 27 is typically a strain gage bridge circuit which generates a voltage proportional to the strain applied by the power tongs unit 21. The computer multiplies the strain value by the length of the tong arm (typically, nine through sixty inches) to determine the actual torque value.

There is shown in FIG. 7 a master circuit which is included in the input/output devices 31 of FIG. 1. The master circuit 31 includes display circuitry for all of the information to be presented to the operator with the exception of the displays in the tong circuit 28 of FIG. 5. A latched decoder 121 is connected to four of the data bus lines 63 to receive data representing one to seven segments to be enabled for a decimal digit. The CPU 51 of FIG. 3 generates an output strobe signal on one of the lines 65 to latch the data into the latched decoder 121. The information in the decoder 121 is then generated to a segment driver 122 which outputs signals to enable from one to seven segments of a decimal digit display included in one of a plurality of two to five digit displays 123. A latch 124 is connected to five of the data bus lines 63 for receiving information with respect to a selected one of five digits to be displayed. The CPU 51 of FIG. 3 generates an output strobe signal on one of the lines 65 to the latch 124 to latch the data which is then generated to a digit driver 125. The digit driver 125 decodes the data and enables the selected digit in the display 123. The display 123 is representative of a separate display for each of typical values such as: a three digit joint number, a five digit actual maximum torque value, a five digit actual make torque value, a two digit top turns number, a two digit bottom turns number, a two digit maximum turns set value, a two digit minimum turns set value, a two digit low turns set value, a five digit reference torque set value, a five digit minimum torque set value, a five digit maximum torque set value, and a five digit keyboard entry value.

The latched decoder can be a model 4511 BCD to seven segment latched decoder which is connected to a model DI220 driver. The latch 124 can be a model 4508 dual four bit latch which is connected to a model DI220 driver which is connected in turn to a model DI602 driver. Typically, each digit of the display 123 is a seven segment gas discharge tube element.

A multivibrator 128, a driver 129 and a light emitting diode 131 are representative of a pair of circuits for indicating low pressure and power loss. A pressure low signal on the line 132 or a power loss signal on a line 133 is an input to the multivibrator 128 to turn it on. The multivibrator 128 generates a pulse train to turn on and off the driver 129 and the LED 131 at a frequency which is recognizable to the human eye as a flashing light. Thus, the operator is warned that there is low pressure in the gas supply used for intrinsic safety, or there is a loss of power to the control circuitry. This allows the operator time to take corrective action or to shut down the system so as not to lose the information that has been generated.

A driver 134 and a light emitting diode 135 are representative of a plurality of warning lights. The CPU 51 of FIG. 3 generates a status signal on one of the status latch lines 58 to the driver 134 to turn on the LED 135. The lighted LED can represent any of the following conditions: turns averaging on wherein the counters of FIG. 4 will count up when the actual torque is above the reference torque and will count down when the actual torque is below the reference torque to a minimum value of zero, auto predict wherein good and bad joints are automatically predicted before they are made, double make where a pipe segment is being threaded into a coupling which is being threaded into the top of the pipe string, printer on, full data, auto dump on, enter data from the keyboards, reference torque, get ready to stop, good joint, bad joint, horn low volume, horn medium volume, and horn high volume.

The master circuit 31 also includes a latch 136 which can be a model MC14508B. The latch 136 is connected to five of the data bus lines 63 for receiving information with respect to the display on the tong circuit 28 of FIG. 5. The CPU 51 of FIG. 3 generates an output strobe signal on one of the lines 65 to the latch 136 to latch the data which is then generated as strobe and data signals on the lines 103, 104 and 109 to master circuit 31 of FIG. 7.

FIG. 8 is a partial block, partial schematic diagram of a printer circuit included in the printer 32 of FIG. 1. The printer makes a permanent record of the actual torque and turns values during the making of a joint. A latch 141 is connected to the data bus lines 63 to receive signals representing data to be printed. The CPU 51 of FIG. 3 generates an output strobe signal on one of the lines 65 to the latch 141 to store the data from the lines 63. The data in the latch 141 is generated to a drivers circuit 142 which is connected to the electrodes 143, typically seven electrodes for printing a five by seven dot matrix of digital data by burning an aluminum coating off a paper base. Before printing, the CPU 51 reads the status of the printer. The CPU 51 generates an input strobe signal on one of the lines 62 to a collector of a transistor 144 in a signal generating circuit 145. The signal on the line 62 enables the transistor 144 which is turned on and off by a phototransistor 146 connected to the base of the transistor 144. The phototransistor 146 is responsive to light from an incandescent lamp (not shown) which is interrupted by the passage of a toothed wheel (not shown) driven by the mechanism which drives the print head across the paper. Thus, the frequency at which the transistor 144 is turned on and off represents the speed of advance of the print head. The collector of the transistor 144 is connected to the base of a transistor 147 which has a collector connected to one of the data bus lines 63. The transistor 144 therefore turns on and off the transistor 147 which generates a pulse signal on the data bus line to indicate to the CPU 51 the advance of the print head in the printer.

A signal generating circuit 148 is shown as a block and is similar to the signal generating circuit 145. One of the input strobe lines 62 from the computer circuit of FIG. 3 is connected for enabling the signal generating circuit 148. The other input to the signal generating circuit 148 is generated by a reed switch 149 connected to a positive five volt power supply. The reed switch closes when the printer motor begins to run and is utilized to keep the motor running. The signal generating circuit 148 responds to the signal generated by the closing of the reed switch 149 to generate a signal on one of the data bus lines 63 to the CPU 51 indicating that the reed switch has closed.

One of the output strobe lines 65 is connected to an input 151-1 of an OR gate 151 which is connected to function as a one shot multivibrator generating a pulse at an output 151-3. The pulse generated by the OR gate 151 is passed through an OR gate 152 from an input 152-1 to an output 152-3 connected to the base of a transistor 153. The transistor 153 has a collector connected to a base of a transistor 154 and to a base of a transistor 155. The transistor 154 and a transistor 156 are connected in a Darlington configuration and the transistor 155 and a transistor 157 are connected in a Darlington configuration, the emitter of the transistor 156 and the collector of the transistor 157 being connected to one side of a permanent magnet motor 158. The other side of the permanent magnet motor 158 is connected to a pair of transistors 159 and 161 and a zener diode 162 which function as a regulated power supply. When the transistor 153 is turned off, the transistors 154 and 156 are turned on such that the power supply voltage is applied to both sides of the permanent magnet motor and the motor is turned off. When the transistor 153 is turned on, the transistors 155 and 157 are turned on to ground the one side of the permanent magnet motor which turns the permanent magnet motor on. When the reed switch 149 closes, the transistors will be maintained in the turned on mode to keep the permanent magnet motor 158 running. The reed switch 149 is opened at the end of each line of printing such that the CPU 51 must generate another output strobe pulse on the line 65 to the OR gate 151 in order to print a subsequent line of information. The latch 141 can be a model MC14508B dual four bit latch.

In summary, the operator utilizes a keyboard, one of the input/output devices 31 of FIG. 1 (not shown), to enter six preset torque and turns values, a torque arm length and a joint number. Each of these parameters will be continuously displayed on one of the displays 123 of the master circuit of FIG. 7. The computer circuit of FIG. 3 compares the actual turns and actual torque values to these preset values at a predetermined rate. A good light 117 of FIG. 5 and an LED 135 of FIG. 7 will be turned on and a single horn tone from the horn 101 of FIG. 5 will be generated when both the minimum torque and minimum turns values have been reached without exceeding either the maximum torque or maximum turns values. A bad joint is indicated by the lighting of the light 118 of FIG. 5 and an LED 135 of FIG. 7 and by a warbling horn tone from the horn 101 of FIG. 5 if the maximum value for either torque or turns is reached before reaching the minimum value for the other parameter (joint 45 of FIG. 2a) or the minimum torque value is reached before reaching the LOW turns value of FIG. 2a. The computer will also indicate a bad joint if, after reaching the minimum torque value, the slope of the make-up line is greater than the slope of the boundary line 47 of FIG. 2a or, after reaching the minimum turns value, the slope of the make-up line is less than the slope of the boundary line 48 of FIG. 2a. These last conditions indicate that it is predicted that a bad joint will be made. This automatic prediction feature allows the operator to stop the make-up before damaging either the pipe or the coupling. In the automatic dump mode operation, a dump signal is generating on the line 93 of FIGS. 4 and 5 to a control for stopping the power tongs unit 21 upon reaching either a good or a bad joint condition. This feature will prevent damage to the joint caused by the operator failing to rapidly disengage the power tongs unit. Another feature which will tend to prevent damage is the lighting of the ready light 116 of FIG. 5 and an LED 135 of FIG. 7 when the make-up line is within a predetermined percentage of the minimum value of one parameter after having reached the minimum value of the other parameter, the parameters being torque and turns.

Figure 9:
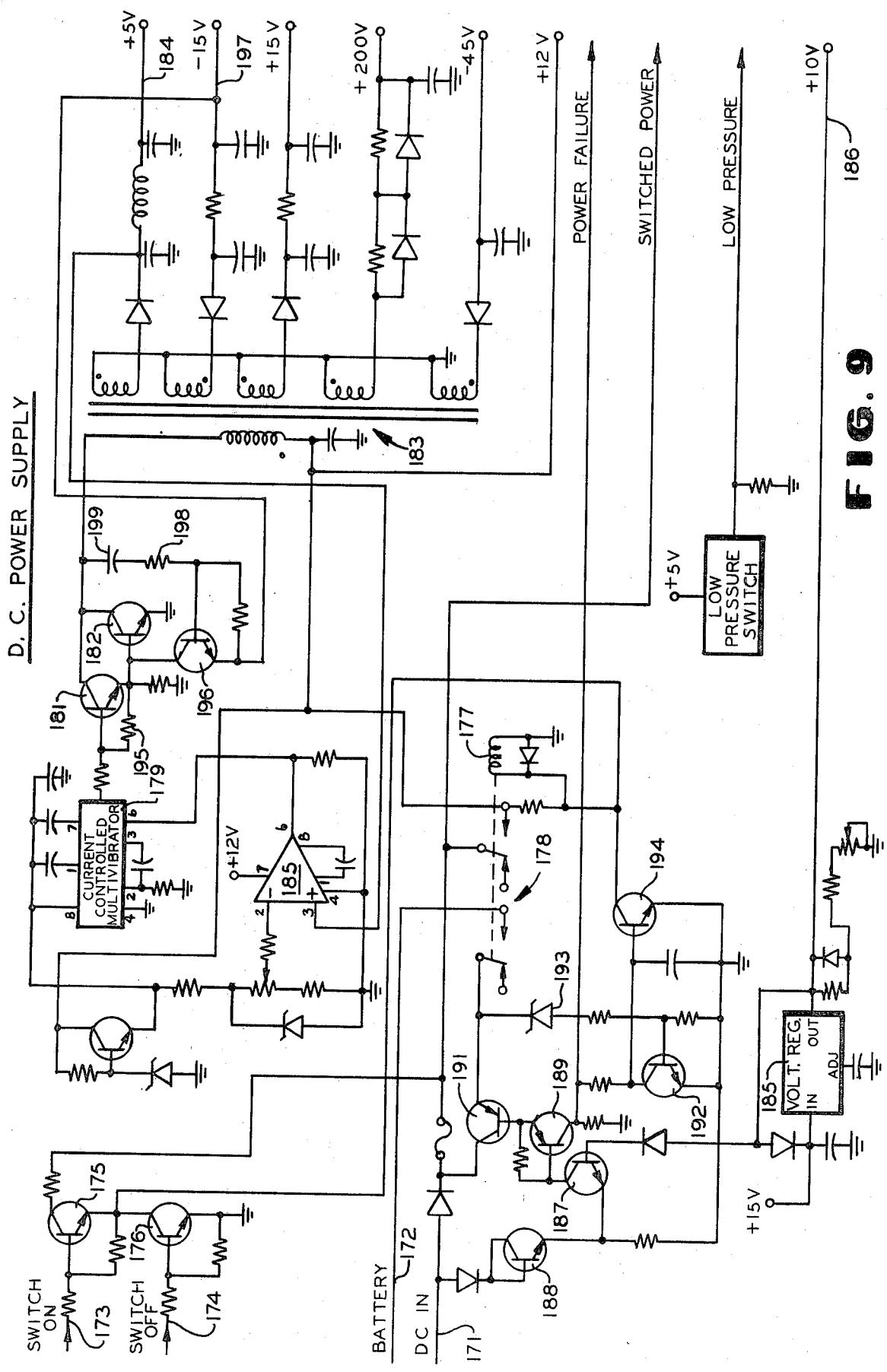
FIG. 9 is a schematic diagram of a d.c. power supply utilized in the present invention.

FIG. 9 is a schematic diagram of a d.c. power supply utilized in the present invention. Inputs to the power supply are a D.C. IN line 171 which is connected an a.c.-to-d.c. converter (not shown) which is the primary source of power for the present invention. A line 172 is connected to a battery which is a secondary source of power for the present invention. The power supply operates on input voltages of from ten to eighteen volts. When the input voltage drops below ten volts, the battery is utilized to operate the computer for from thirty to forty-five minutes. When the battery is discharged to about the ten volt level, the computer will be automatically shut down to prevent deep discharging which would damage the battery. If the d.c. power is restored before the automatic shutdown, the battery source is automatically switched off. Therefore, the battery prevents the computer from losing the stored current values if the external power supply fails. The power supply generates regulated output voltages at positive five volts, positive ten volts, positive and negative fifteen volts, negative forty-five volts and positive two hundred volts as well as an unregulated positive twelve volt output.

A switch on line 173 and a switch off line 174 are connected to a base of each of respective transistors 175 and 176. The transistor 175 has a collector connected to the line 171 and an emitter connected to a relay coil 177. When a front panel switch (not shown) is turned on, a signal is generated on the line 173 to turn on the transistor 175 which energizes the relay coil 177 to switch relay contacts 178 from the position shown to the other position. This operation connects the line 171 to the relay coil 177 to latch the switch contacts 178 in the "power supply on" position. The transistor 176 has a collector connected to the relay coil 177 and an emitter connected to the power supply ground. When the front panel switch (not shown) is in the off position, a signal is generated on the line 174 to turn on the transistor 176 which in turn de-energizes the relay coil 177 returning the switch contacts 178 to the position shown to turn off the power supply.

The inverter portion of the power supply operates in a fly back mode. A current controlled multivibrator 179, which can be a model MC3380P, briefly turns on a pair of transistors 181 and 182 providing current flow in a primary of a transformer 183. When the transistors 181 and 182 are turned off by the multivibrator 179, the inductive kick-back of the transformer 183 charges the various filter capacitors through the secondary windings of the transformer and associated diodes. The voltage present on a positive five volt line 184 is sensed by an operational amplifier 185, which can be a model MC1748CP. The operational amplifier 185 controls the repetition rate of the multivibrator 179 at an input 179-6. If the output on the line 184 drops below five volts, the multivibrator 179 responds by generating pulses to turn on and off the transistors 181 and 182 at a faster rate. If the voltage on the line 184 increases above five volts, the multivibrator 179 slows down the pulse rate. Since the voltage present at all secondary windings on the transformer is determined solely by the turns ratio and the resistive loses of each of the secondary windings, all of the output voltages are regulated in accordance with the positive five volts voltage.

A separate voltage regulator 185, which can be a model LM317T, is driven from the positive fifteen volts output to generate a regulated positive ten volt output on a line 186 which output voltage is utilized to excite the strain gage bridge for measuring torque. Since variations in this voltage directly affect the accuracy of the torque turn computer, a more precise regulation is required for this ten volt power supply. The regulated ten volts also provides a reference voltage for the switch over point from external d.c. power to the battery power. The ten volt signal is applied to a base of a transistor 187 having an emitter connected to an emitter of a transistor 188. The transistors 187 and 188 function as a differential pair with the transistor 188 having its base connection to the d.c. input power line 171. When the input voltage on the line 171 falls below the ten volt level on the line 186, the transistor 187 turns on turning on a transistor 189 connected to the collector of the transistor 187. The transistor 189 turns on a transistor 191 which is connected between the battery line 172 and the D.C. IN line 171. As long as the battery voltage on the line 172 is above ten volts, a transistor 192 is turned on through a zener diode 193 thereby turning off a transistor 194. When the battery voltage drops below ten volts, the transistor 192 turns off which turns on the transistor 194 thereby grounding the coil 177 to return the switch contacts 178 to the position shown turning off the power supply and disconnecting the battery. This prevents a deep discharge of the battery.

The power supply includes circuitry for rapidly shutting off base current to the transistors 181 and 182 thereby increasing the efficiency of the power supply. The transistor 181 is a high power transistor which switches the primary current in the transformer 183. Maximum efficiency occurs when this transistor is turned on and off sharply. However, any transistor capable of handling the required currents requires an appreciable time to dissipate the base charge at turnoff. The normal method of dissipating this base charge is to utilize a low value of a base to emitter resistor 195. Ideally, the base resistor value should be as low as possible in order to dissipate the charge quickly. However, when turning the transistor on, the value of the resistor should be as large as possible so that it does not represent an appreciable shunt to the input current.

In the present invention, the resistor 195 has a reasonably high value and a transistor 196 has a collector connected to a base of the transistor 182 and an emitter connected to the negative fifteen volt output line 197. The base and the emitter of the transistor 196 are also connected through a series connected resistor 198 and capacitor 199 to the collectors of the transistors 181 and 182. Since the charge across the capacitor 199 cannot change instantaneously, the voltage as the base of the transistor 196 increases rapidly to turn on the transistor 196 providing a low impedance shunt for the base charge current. The value of the resistor 198 is selected to be large enough to avoid over stressing the transistor 196 and to also stretch the time of the input pulse voltage to the base so that the capacitor 199 does not charge rapidly. When the switching transistor 182 turns on again, the transistor 196 is turned off and back biased. The capacitor 199 discharges through the resistor 198.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

I claim:

1. In an apparatus for making threaded joints from a pair of threaded members including means for rotating one of the members with respect to the other member, means for generating a signal representing the actual torque applied to the one member by the means for rotating, means for generating a signal representing the average turns made by the one member and means responsive to the actual torque and the average turns signals for indicating the actual torque and the average turns values, the average turns signal generating means comprising: means responsive to the actual torque signal for generating a first signal when the value of the actual torque is greater than the value of a predetermined reference torque and for generating a second signal when the value of the actual torque is less than said reference torque value; means responsive to the rotation of the one member for generating a signal representing actual turns made by the one member; means responsive to said actual turns signal for accumulating a count total of the actual turns, said accumulating means being responsive to said first signal for incrementing said count total in response to said actual turns signal and being responsive to said second signal for decrementing said count total in response to said actual turns signal; and means responsive to said count total for generating the average turns signal.

2. An apparatus according to claim 1 wherein said actual turns signal generating means generates a pulse signal for each predetermined increment of a turn made by the one member.

3. An apparatus according to claim 1 including means responsive to said count total for inhibiting said accumulating means from decrementing said count total below zero.

4. An apparatus according to claim 1 wherein said means for generating said first and second signals is effective to generate said second signal only after having generated said first signal.

5. A control means for an apparatus for assembling threaded pipe sections to form a pressure sealed connection between a pair of the pipe sections, the apparatus including means connected to one of the pair of pipe sections for rotating that pipe section, means responsive to the torque applied to the one pipe section by the pipe rotating means for generating a signal representing the applied actual torque value, and means responsive to the rotation of the one pipe section for generating a signal representing the actual turns of the one pipe section, the control means comprising: means for generating a signal representing a reference torque value; means responsive to said reference torque signal and the actual torque signal for generating an up count signal and a down count signal when the value of said actual torque signal is greater than and less than the value of the reference torque signal respectively, said up and down count signals being generated only after the first time the value of said actual torque signal exceeds the value of the reference torque signal; means responsive to the actual turns signal for counting the turns, said counting means being responsive to said up count signal for incrementing a count total of the turns in response to the actual turns signal and being responsive to said down count signal for decrementing said count total in response to the actual turns signal; means for generating an average actual turns signal representing said count total of said counting means; and means responsive to the actual torque signal and said average actual turns signal for controlling the pipe rotating means.

6. A control means according to claim 5 including means responsive to the actual turns signal for generating a constant duration pulse for each predetermined increment of a turn and wherein said counting means counts each of said pulses as one of the predetermined increments.

7. A control means according to claim 5 including means responsive to said counting means count total for inhibiting said counting means from decrementing said count total below zero.

8. A control means according to claim 7 including a gate means connected between said actual turns signal generating means and said counting means and wherein said inhibiting means is responsive to said up count signal or a count total in said counting means greater than zero for enabling said gate means to pass the actual turns signal and is responsive to said down count signal and a count total of zero for disabling said gate means to inhibit said gate means from passing the actual turns signal.

* * * * *